May 26, 1964  A. MISELLI  3,134,215
MOWING MACHINE WITH ADDITIONAL BLADES AT THE ENDS OF THE
MOWER BAR FOR CUTTING PLANTS OR WEEDS ALONG
THE EDGE OF THE MOWING AREA
Filed June 27, 1960
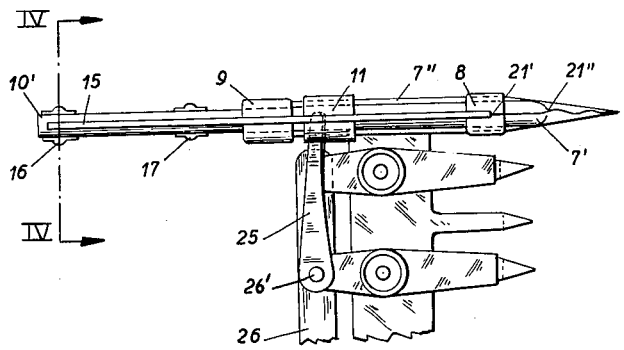
Fig.1
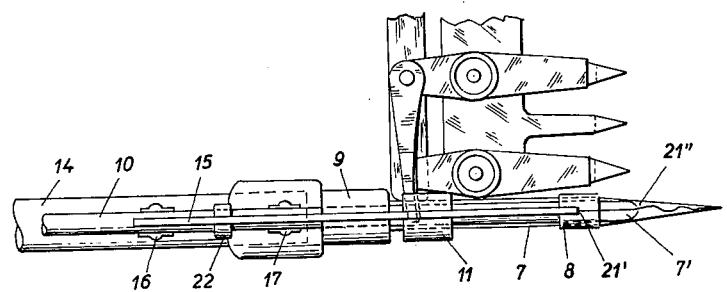
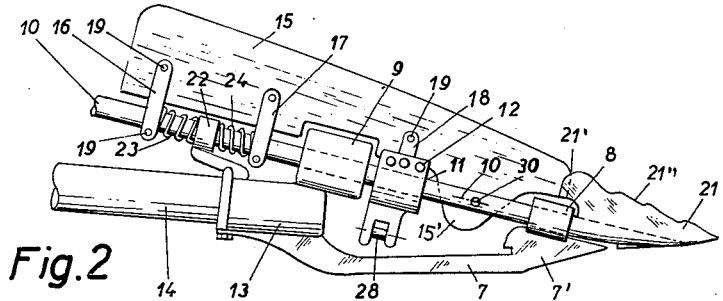
Fig.2
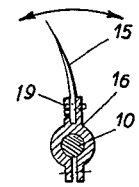
Fig.4
Fig.3
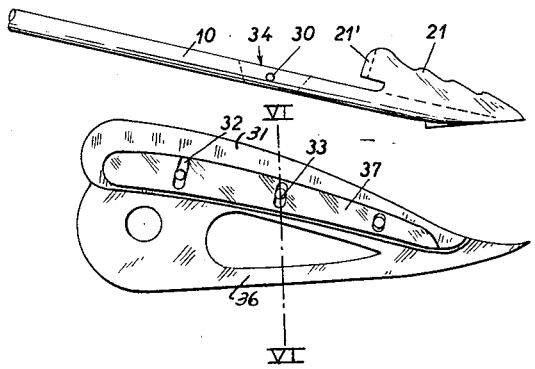
Fig.5
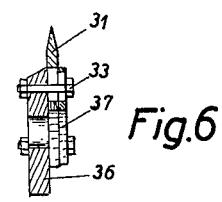
Fig.6
INVENTOR.
Afro Miselli
BY Richards & Geier
ATTORNEYS

United States Patent Office 3,134,215
Patented May 26, 1964

3,134,215
MOWING MACHINE WITH ADDITIONAL BLADES AT THE ENDS OF THE MOWER BAR FOR CUTTING PLANTS OR WEEDS ALONG THE EDGE OF THE MOWING AREA
Afro Miselli, Piazza Martiri Della Liberta, Gerdone Val Trompia, Brescia, Italy
Filed June 27, 1960, Ser. No. 38,908
Claims priority, application Italy June 27, 1959
1 Claim. (Cl. 56—317)

If in a field to be mowed there are plants offering a considerable resistance to the cutting action, and for greater reason if in the said fields plants are found which offer a different degree of such resistance, then because of the partial action of the last one or few pairs of blades on the mower bar, there may be formed bunches of partially cut plants at the edges of the mowed area. These partially cut plants provide an obstacle to the progress of the mowing machine, holding back its outer ends to the point of stopping or damaging the machine. In all such cases the amount of the torque which in all mowing machines is formed between the unaligned traction and drag forces is increased, tending to make the machine drift towards the field to be mowed.

The present invention obviates this difficulty and enables the mover bar to make a regular progress even under the most unfavorable conditions, this being achieved by fitting at the extreme ends of the said bar two strong addition blades in a substantially vertical position, attached to two shoes riding on the ground. The blades may be either stationary or driven into reciprocating motion, in which latter case means are also provided for damping the vibration caused by such reciprocating motion. When the blades are of the moving type, they are driven by the counter-bar which in turn is driven by the tractor's power take-off.

The detailed description of the invention will be more easily followed by referring to the enclosed drawings which represents, as a non-limiting example, one preferred embodiment hereof. In the drawing:

FIG. 1 is a plan view of the mower bar;
FIG. 2 is an elevation view of the same;
FIG. 3 represents the oscillating bar to which the end blade is attached;
FIG. 4 is a cross-section of the bar shown in FIG. 3, taken across a blade attachment sleeve along the line IV—IV of FIG. 1;
FIG. 5 is an alternate arrangement of the mower bar end shoe, carrying a fixed blade;
FIG. 6 is a cross-section along the line VI—VI of FIG. 5.

With reference to FIGS. 1 to 4, the mowing machine according to the invention differs from the similar machines of known type in that it is fitted with the two shoes 7, 7″ at the ends of the mower bar. The drawings do not show other parts of the mowing machine which are of a known type.

As it clearly appears from FIG. 2, shoe 7 has a curved bottom, which terminates with a point 7′ to which is attached a bearing 8 aligned with a second bearing 9 in which shaft 10 is oscillatably mounted. This second bearing 9 is attached to a sleeve 13, into which fits the pipe 14.

Between bearings 8 and 9 the shoe presents a free space within which a lever 11 is free to swing, such lever being clamped by means of bolts 12 on shaft 10, driving the latter into an oscillating motion in the manner described below.

On the oscillating shaft 10, supported by bearings 8 and 9, is attached a blade 15, fixed to the shaft by means of two brackets 16 and 17. Bolts 19 lock the blade and the oscillating shaft 10 on lever 11, which, by means of pin 28, receives from connecting rod 25 the reciprocating motion which actuates the blades 15 and 21. As is described in detail hereinafter, the connecting rods 25 (FIG. 1) are reciprocated in the directions of their lengths by the main drive of the machine which is not shown in the drawing. One end of each rod 25 carries the pin 28 while other end is pivotally connected at 26′ with the mower blade bar 26 and the cutters of mower. Thus the reciprocation of the rods 25 is transmitted to the blades 15 and 21.

The front end of oscillating shaft 10 is fitted with an arrowhead-shaped blade 21, the upper edge of which preferably carries corrugations or sawteeth 21″, as shown in FIGS. 2 and 3, so that it can slide under any stubble, plants and weeds that may present themselves transversally or perpendicularly to the motion of the bar. At point 21′, blade 21 overlaps blade 15, so that such plants as may not be immediately cut by the front part of the blade may be cut later, following the edge of blade 15.

In order to ensure a perfect cutting action, blade 15 is arc-shaped (FIG. 4), so that it does not cut during its clockwise swinging movement, but during its counter-clockwise swinging movement (looking in the direction of FIG. 4) it engages the plants or stubble and cuts them.

Attached to the sleeve 13 of shoe 7 is fitted a collar 22, which fits over shaft 10 without any supporting function, but merely serves to provide a rest for the ends of two coil springs 23 and 24 wound in opposite directions around shaft 10, the other ends thereof being attached respectively to brackets 16 and 17.

In the condition of rest, the two springs 23 and 24 are installed with no tension or with a very slight tension in opposite directions, maintaining of blade in a central position. Under the action of two connecting rods 25 (FIG. 1), linked to mower blade bar 26, pin 28 on lever 11 drives into reciprocating motion shafts 10 and 10′ at the ends of the bar, and shoe blades 15 and 21. In one direction this motion loads spring 23, and in the opposite direction it loads spring 24, so that at the end of each angular stroke of blades 15 and 21 either of the said two springs checks the oscillating system and damps the vibrations of the masses in reciprocating motion.

As it appears from FIG. 2, to ensure a better linkage between blade 15 and oscillating shafts 10 and 10′, the latter have a slot 34 into which fits a half-moon extension 15′ of blade 15. A bolt or screw 30, extending diametrically through the shafts, locks the extension 15′ and attaches the two parts together. The function of this extension of blade 15 is highly important, because it frees the mower blades at the point where the tougher stubble and weeds are more likely to form an accumulation. The connecting rods 25 reciprocate in their longitudinal direction. Since they are connected by pins 28 to levers 11, the levers 11 will oscillate in directions perpendicular to the plane of the drawing. Since the levers 11 are firmly connected with blades 15 and since the blades 15 are firmly connected with shafts 10 by brackets 16 and 17 and bolt 30, the oscillating movement of the levers 11 will be transmitted to the shafts 10. Thus the oscillating movement of shafts 10 and levers 11 will result in oscillating movement of blades 15 in a pendulous manner. As indicated in FIG. 4, each blade 15 will be constrained to move in an arcuate path about its shaft 10 as its axis.

FIG. 5 represents an alternate arrangement in which shoe 36, which is suitably connected to bar 26, carries a fixed blade 31 which can be fixed in various positions by means of bolts 33 which lock the blade in various positions in combination with slots 32 which enable the blade to be moved with respect to the shoe. FIG. 6 is a cross-section of FIG. 5, showing covering plate 37 which provides passage for blade 31.

Any changes that may be introduced and that, being based on the same inventive concept, tend to achieve the same or a similar result, shall fall within the scope of protection of the invention.

What I claim is:

In a mowing machine two cutting devices located on opposite sides of the machine, each of said cutting devices comprising an elongated shoe, a bearing connected to said shoe adjacent an end thereof, a second bearing alined with the first-mentioned bearing and spaced therefrom, a shaft oscillatably mounted in said bearings, a lever firmly connected with said shaft and extending in a recess formed in said shoe, two brackets carried by said shaft, an arcuate blade carried by said brackets and firmly connected with said lever, a reciprocable connecting rod pivotally connected with said lever, an arrowhead-shaped blade carried by an end of said shaft, said two blades having overlapping portions, a collar enclosing said shaft, means connecting the second bearing and said collar with said shoe, two springs, each of said springs having an end engaging said collar and another end connected with a separate bearing, said shaft having a slot, the first-mentioned blade having a portion extending through said slot, and means locking the last-mentioned blade portion in said slot.

References Cited in the file of this patent

UNITED STATES PATENTS

| | | |
|---|---|---|
| 1,179,702 | Cutsforth | Apr. 18, 1916 |
| 2,397,310 | Donald | Mar. 26, 1946 |
| 2,530,732 | Ronning | Nov. 21, 1950 |
| 2,532,230 | Hupp | Nov. 28, 1950 |
| 2,685,162 | Head | Aug. 3, 1954 |